3,500,914
METHOD FOR RECOVERING OIL
John C. Petteway, Dallas, Tex., assignor to Hunt Oil
Company, Dallas, Tex., a corporation of Delaware
Filed Apr. 19, 1967, Ser. No. 632,082
Int. Cl. E21b 43/20
U.S. Cl. 166—268    11 Claims

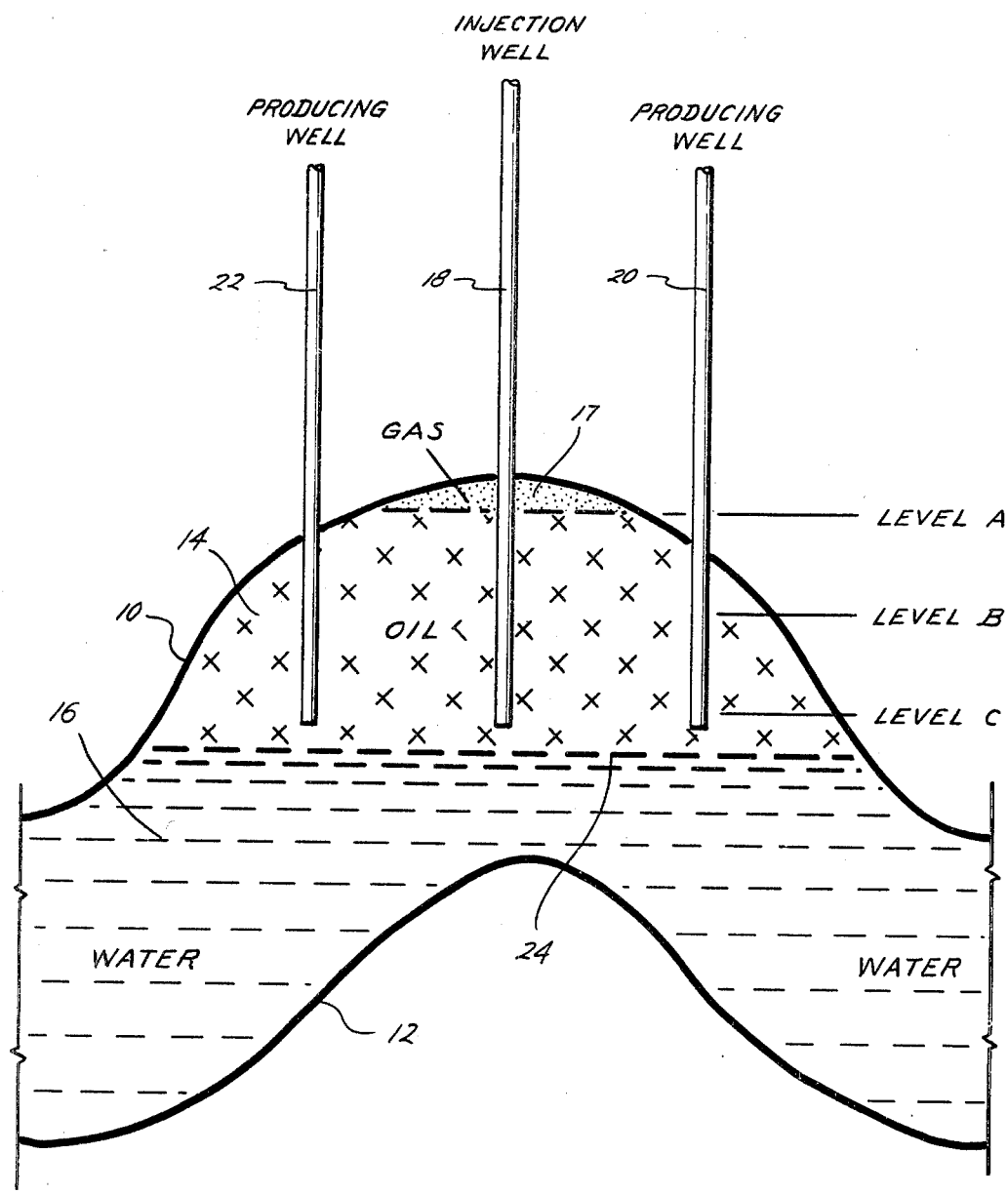

ABSTRACT OF THE DISCLOSURE

Oil recovery from a reservoir having unusually low recovery efficiency from a natural water drive can be improved by first sweeping the oil pool with a gas from top to bottom before producing oil from the oil pool by encroachment of water as a result of the natural water drive.

BACKGROUND OF THE INVENTION

In oil-bearing, subterranean reservoirs having natural water drive, a substantial amount of oil remains in place after production by the natural water drive. This residual content frequently runs as high as 45% of the original oil in place, and represents a significant waste of a natural resource. In reservoirs which have a low recovery efficiency as a result of irregular, "dead-end" pore spaces, the problem is particularly acute.

Once the oil is produced and water fills the previous oil pool, there is no known economically feasible technique of recovering the residual oil content. A technique by which the efficiency of oil recovery can be increased and the residual oil content decreased is obviously needed.

SUMMARY OF THE INVENTION

The invention provides techniques which can improve the efficiency of the oil recovery from a subterranean reservoir. The techniques are particularly applicable to oil-bearing anticlines having a natural water drive, or an otherwise substantially constant pressure system.

One embodiment in accordance with the invention comprises sweeping an oil pool with a gas from top to bottom prior to water encroachment by injecting gas into the oil pool at substantially reservoir pressure. Oil is simultaneously produced from the oil pool during the gas injection, thereby permitting maintenance of a substantially constant level of oil-water contact at the lowermost portion of the oil pool. After the oil pool has been swept by the gas injected to the extent desired, oil is further produced, and a substantial portion of the injected gas recovered, as a consequence of the natural water drive or other drive mechanism.

Gases or other fluids having specific gravity at reservoir conditions less than that of the oil in the oil pool may be injected. Suitable gases include natural gas, carbon dioxide, nitrogen, air, and the like. Exhaust gas from internal combustion engines may be employed.

During injection of the gas or other fluid, oil should be produced from the reservoir at a volumetric rate substantially equal to the volumetric rate, at reservoir conditions, at which the gas or fluid is injected into the oil pool. Since the overall system is substantially constant in pressure as a result of the natural water drive or other drive mechanism, maintenance of a constant pressure above the water table will maintain the top level of the water substantially constant during sweeping of the reservoir.

Preferably, the gas is injected into the reservoir near or above the top of the oil pool, and oil is produced during injection from lower levels in the oil pool to allow the injected gas to sweep the oil down through the oil pool. During injection oil should be produced from the bottom of the oil pool as near the oil-water contact as practical while minimizing breakthrough of water into the oil produced, or from successively lower levels in the oil pool until such a bottom level is reached, if maximum efficiency is to be achieved.

The technique described herein is particularly applicable to subterranean, oil-bearing reservoirs having a low recovery efficiency as a result of irregular, "dead-end" pore spaces. It is believed that such pore spaces trap oil during influx of a natural water drive and cause significant loss in recovery efficiency. Sweeping the oil pool from top to bottom with a gas or other fluid having a lower specific gravity than the oil, however, will eliminate much of this loss.

DESCRIPTION OF THE DRAWING

The drawing illustrates schematically in section a pinnacle anticline having an oil pool above a natural water drive with an injection well and two producing wells suitably located therein in accordance with the invention.

DESCRIPTION OF THE PREFERRED EMBODIMENTS

With reference to the drawing, a symmetrical, oil-bearing, subterranean reservoir resembling a pinnacle is shown between two impermeable strata represented by the lines 10 and 12. The oil-bearing reservoir, which may result from a subterranean reef, includes an oil pool 14, a natural water drive 16, and a small gas cap 17 above the oil pool 14. Three wells 18, 20, and 22 extend into the oil pool 14.

Any number of wells of course could be suitably located in the oil-bearing stratum. Further, the symmetrical pinnacle-shaped reservoir shown is for purposes of illustration, and persons in the art will realize that naturally occurring formations exist in various shapes and that the principles disclosed herein are applicable to a variety of such formations. Pinnacle-shaped reservoirs occur frequently in Alberta, Canada.

Oil would be produced from the wells 18, 20, and 22, in accordance with prior art, by allowing the natural water drive 16 to encroach into the oil pool 14, thereby forcing oil into the wells 18, 20, and 22 and up to the surface. The efficiency of recovery has been shown to be low in accordance with this technique.

In accordance with the invention, well 18 is completed near or above Level A for fluid injection into the reservoir. Wells 20 and 22 may be completed initially at any level in the oil pool 14 suitable for the production of oil, such as Level B or Level C. Gas or other suitable fluid is then introduced into the reservoir through well 18 to enlarge the gas cap and force the oil in the oil pool 14 downwardly. At the same time, oil is produced through one or more of the wells 20 and 22 at a volumetric rate substantially equal to the volumetric rate at reservoir conditions of the gas being injected. Consequently, the level of the oil-water contact 24 will remain virtually constant.

The producing wells 20 and 22 should be completed at a sufficiently low level, or a sufficiently laterally displaced location from the well 18, to minimize the possibility of injected gas breaking through into the producing wells 20 and 22. If wells 20 and 22 are initially completed at a level higher than Level C, they should be recompleted at a lower level, such as Level C, after gas breaks through in order to ensure a complete sweeping of the oil pool 14 with injected gas and consequently optimum recovery. The producing wells of course should be completed in the final stage of injection as low as practical in the oil pool 14 to ensure complete sweeping of the oil pool 14.

It will be apparent, however, that the producing wells cannot be completed too near the oil-water contact 24 without inducing an undesirable break-through of water from the natural water drive 16 into the oil produced. The optimum level chosen, of course, will depend on reservoir conditions, such as temperature, pressure, chemical nature, porosity, and the like.

After sweeping the oil pool 14 with injected gas, the injection well 18 may be converted to a producing well, the producing wells 20 and 22 recompleted at a level higher than Level C to avoid water break-through, and all of the wells then produced as a result of influx of water into the oil pool 14 from the natural water drive 16.

By placing a substantial amount of free gas in the reservoir before allowing influx of water by the natural water drive, the residual oil content is expected to decrease by an amount approximately equal to the free gas content remaining in the reservoir after water influx. Extensive core work in pinnacle-shaped reefs indicates that a residual free gas content up to about 20% can be expected, depending of course upon the extent of irregularities in the pore spaces in the oil-bearing stratum. The entire process is preferably operated at constant reservoir pressures to avoid substantial movement of the water table under the oil pool until after placement of the free gas in the reservoir.

Enhanced recovery may also be obtained in accordance with the principles disclosed herein since sweeping the reservoir with gas from top to bottom, while preventing encroachment of water, results in oil production by gravity drainage. Production by gravity drainage is frequently more efficient than production by other methods.

The techniques disclosed herein are applicable whether or not a gas cap exists in the reservoir. If the oil in the reservoir is not initially saturated with gas, the injected gas will tend to saturate the oil with gas while sweeping the reservoir.

What is claimed is:

1. A method for recovering oil from a substerranean reservoir having an oil pool above a natural water drive, which method comprises injecting into the reservoir in or above the oil pool, at substantially reservoir pressure, fluid having specific gravity at reservoir conditions less than that of the oil in the oil pool; producing oil from the oil pool during the injection of said fluid at one or more locations lower than where the fluid is injected; continuing the injection of said fluid and the production of said oil until a substantial amount of free gas is placed throughout said oil pool; oil being produced from the oil pool during the last stage of fluid injection at a level as near the oil-water contact as practical while minimizing break-through of water into the oil produced; subsequently discontinuing injection of said fluid; and then producing oil from said reservoir as a result of said natural water drive.

2. The method defined in claim 1 wherein said fluid is gas.

3. The method defined in claim 2 wherein said gas includes at least one of the group consisting of natural gas, carbon dioxide, nitrogen, and air.

4. The method defined in claim 2 wherein said gas includes exhaust gas.

5. The method defined in claim 1 wherein said reservoir is an anticline resembling a pinnacle and has pore spaces with dead ends which tend to trap oil in the reservoir.

6. The method defined in claim 1 wherein oil is produced from said oil pool during injection of said gas at a volumetric rate substantially equal to the volumetric rate, at reservoir conditions, at which said fluid is injected into said oil pool.

7. The method defined in claim 6 wherein the level of oil-water contact in said reservoir is maintained substantially constant during injection of said fluid.

8. The method defined in calim 1 wherein said fluid is injected into the reservoir near or above the top of the oil pool.

9. A method for recovering oil from a subterranean reservoir resembling a pinnacle anticline having pore spaces with dead ends which tend to trap oil in the reservoir, and having an oil pool above a natural water drive, which method comprises injecting into the reservoir near or above the top of the oil pool gas at substantially reservoir pressure; producing oil from a lower level of said oil pool during injection of said gas at a volumetric rate substantially equal to the volumetric rate, at reservoir conditions, at which said gas is injected, thereby maintaining the level of oil-water contact in said reservoir substantially constant during injection of said gas, said oil being produced, at least during the last stage of fluid injection, at a level as near the oil-water contact as practical while minimizing break-through of water into the oil produced; continuing injection of gas into the reservoir until gas breaks through into the oil produced at said level as near the oil-water contact as practical and a substantial amount of free gas is placed in said pore spaces with dead ends within said oil pool; and then producing oil from the reservoir as a result of the natural water drive.

10. The method defined in claim 9 wherein said gas includes at least one of the group consisting of natural gas, carbon dioxide, nitrogen, and air.

11. The method defined in claim 9 wherein said gas includes exhaust gas.

References Cited

UNITED STATES PATENTS

| | | | |
|---|---|---|---|
| 2,936,030 | 5/1960 | Allen | 166—42 |
| 1,899,497 | 2/1933 | Doherty | 166—9 |
| 2,297,832 | 10/1942 | Hudson | 166—7 |
| 2,885,003 | 5/1959 | Lindauer | 166—9 |
| 3,193,006 | 7/1965 | Lewis | 166—7 |

OTHER REFERENCES

Morrow, "Updip Oil Recovery By Downdip Gas Injection," The Petroleum Engineer, April 1957 (pp. B–28 to B–32 relied on).

Muscat, Physical Principles of Oil Production, 1st Edition, McGraw-Hill Book Co., Inc., New York, 1949 (pp. 528, 529, 582–585, 589, 590 and 631 relied on).

Uren, Petroleum Production Engineering, Exploitation, 3rd ed., New York (1953) (pp. 480–486 relied on).

STEPHEN J. NOVOSAD, Primary Examiner